US008442223B2

(12) United States Patent
Kim et al.

(10) Patent No.: US 8,442,223 B2
(45) Date of Patent: May 14, 2013

(54) VIDEO DEVICE AND CONTROL METHOD THEREOF

(75) Inventors: Ki-ho Kim, Seoul (KR); Eun-kyung Kang, Seoul (KR); Do-young Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1575 days.

(21) Appl. No.: 11/357,132

(22) Filed: Feb. 21, 2006

(65) Prior Publication Data

US 2006/0236355 A1 Oct. 19, 2006

Related U.S. Application Data

(60) Provisional application No. 60/673,800, filed on Apr. 22, 2005.

(30) Foreign Application Priority Data

Apr. 15, 2005 (KR) .................. 10-2005-0031627

(51) Int. Cl.
*H04N 7/167* (2011.01)
*H04N 7/173* (2011.01)
*H04N 7/16* (2011.01)

(52) U.S. Cl.
USPC ............. 380/201; 725/31; 725/131; 725/139; 725/151

(58) Field of Classification Search .............. 725/25, 725/31, 131, 139, 151; 380/201
See application file for complete search history.

(56) References Cited

U.S. PATENT DOCUMENTS

| 6,810,387 | B1 | 10/2004 | Yim | |
|---|---|---|---|---|
| 7,062,068 | B2 | 6/2006 | Hirai et al. | |
| 2001/0017828 | A1 | 8/2001 | Yamada | |
| 2002/0044657 | A1* | 4/2002 | Asano et al. | 380/201 |
| 2003/0154377 | A1* | 8/2003 | Hirai et al. | 713/176 |
| 2004/0098252 | A1 | 5/2004 | Ichimura | |
| 2005/0060749 | A1* | 3/2005 | Hong et al. | 725/78 |
| 2006/0140585 | A1* | 6/2006 | Strasser | 386/94 |

FOREIGN PATENT DOCUMENTS

| CN | 1288334 A | 3/2001 |
|---|---|---|
| CN | 1308331 A | 8/2001 |
| JP | 2002-271756 A | 9/2002 |
| KR | 10-2000-0003895 A | 1/2000 |
| WO | WO 0105150 A1 * | 1/2001 |

OTHER PUBLICATIONS

Hamilton, Jeff. OpenCableTM, "OpenCableTM POD Copy Protection System," IS-POD-CP-INT01-000107, Jan. 2000.*

* cited by examiner

*Primary Examiner* — Pankaj Kumar
*Assistant Examiner* — Randy Flynn
(74) *Attorney, Agent, or Firm* — Sughrue Mion, PLLC (57) ABSTRACT

A video device for determining whether a digital broadcasting channel through a point of deployment (POD) is reproduced, includes a memory; a communicator to communicate with the POD; a controller which stores a first copy control information (CCI) value with respect to a first digital broadcasting channel in the memory, if converting the first digital broadcasting channel into an analog broadcasting channel, and sets the first CCI value stored in the memory to a second CCI value with respect to a second digital broadcasting channel if the second CCI value is not received through the communicator from the POD and if converting the analog broadcasting channel into the second digital broadcasting channel.

9 Claims, 6 Drawing Sheets

FIG. 1

| CCI VALUE(EMI) | MEANING |
|---|---|
| 00 | COPY FREE : COPY NOT RESTRICTED |
| 01 | NOT MORE COPY : NO FURTHER COPYING IS PERMITTED |
| 10 | ONE COPY : ONE GENERATION COPY IS PERMITTED |
| 11 | NEVER COPY : COPYING IS PROHIBITED |

| CCI VALUE(APS) | MEANING |
|---|---|
| 00 | COPY PROTECTION ENCODING OFF |
| 01 | AGC PROCESS ON, SPLIT BURST OFF |
| 10 | AGC PROCESS ON, 2 LINE SPLIT BURST ON |
| 11 | AGC PROCESS ON, 4 LINE SPLIT BURST ON |

FIG. 6

VIDEO DEVICE AND CONTROL METHOD THEREOF

CROSS-REFERENCE TO RELATED APPLICATIONS

This application claims priority from Korean Patent Application No. 2005-0031627, filed on Apr. 15, 2005, in the Korean Intellectual Property Office and U.S. Provisional Application No. 60/673,800, filed on Apr. 22, 2005, the disclosures of which are incorporated herein by reference.

BACKGROUND OF INVENTION

1. Field of Invention

The present invention relates to a video device and a control method thereof and, more particularly, to a video device and a control method thereof which automatically set a copy control information (CCI) value when the CCI value related to content of an identical digital broadcasting channel is not received in channel conversion.

2. Description of the Related Art

Recently, digital terrestrial television broadcasting and digital satellite broadcasting have been started as broadcasting mediums have rapidly become digitized all over the world.

A digital cable broadcasting standard is classified as an OpenCable standard which is used in America and Korea and the like, a digital video broadcasting cable (DVB-C) standard which is used in Europe, and an integrated service digital broadcasting cable (ISDB-C) standard which is used in Japen.

Herein, the OpenCable standard is formed on the basis of a Moving Picture Exports Group-2 (MPEG-2) used as a video standard and a Data Over Cable Service Interface Specification (DOCSIS) used as a transmit standard of a cable modem. The OpenCable standard is a set of interface standards of a digital device like a Set Top Box of a digital television manufactured at Cable Television Laboratories, Inc., and definitions thereof.

The OpenCable standard separates a conditional access part from the Set Top Box. Therefore, to satisfy Federal Communications Commission (FCC) rules in the OpenCable standard, the existing Set Top Box consists of a video device (host) not having the conditional access part and a conditional view module (hereinafter referred to a Point Of Deployment, POD) including the conditional access part.

Hereinafter, a copy protection system that involves matching between the video device and the POD in the OpenCable standard will be described as follows. The OpenCable standard is embodied with two kinds of the anti-copy systems.

One is a Conditional Access System (CAS) with respect to a digital cable broadcasting sending system, and the other is a Copy Protection System (CPS) between the POD separated from the video device (host) and the video device. Generally, an anti-copy system means the CPS of the latter.

The existing digital broadcasting receiving device system has a function which receives coded content from the sending system and selectively restores the coded content into a common video, inside the receiving device, (i.e., an Imbedded Conditional Access system). The POD means a security module which separates a conditional access function from the receiving device.

In the CPS, the coded digital content, which is sent from a sending system, is decoded at the POD used as a subscriber receiving device, (i.e., a CA Payload Decryption) and is changed to the digital content of a plaintext situation. And then the content is again coded by the CPS standard (i.e., a CP Encryption), and the coded content is transported to the video device. With such a coding, the CPS restricts the digital content of the plaintext to being transported from the POD to the video device.

Such a CPS is applied to all kinds of content, but it does not mean that all kinds of content are necessarily coded and then transported to the video device. That is, the content to which the CPS is not applied, for example, can receive the public channel and only the charged digital content is protected from the copying.

The application standard of coding for the copy protection is preferentially given to a content maker manufacturing the appropriate content. The information, which determines whether the CPS is allowed or not, is referred to as a Copy Control Information (CCI) value, and the POD of the receiver receives the CCI value corresponding to the transported digital content. Herein, the sending system transports the message, which controls whether the receiver is allowed to contact the charged digital content or not, with a Private Section form to the MPEG-2 Transport Stream.

Therefore, the video device and the POD control whether the video device related to the digital content of the appropriate channel can be copied or not, through the CCI value exchange.

Figure 1:
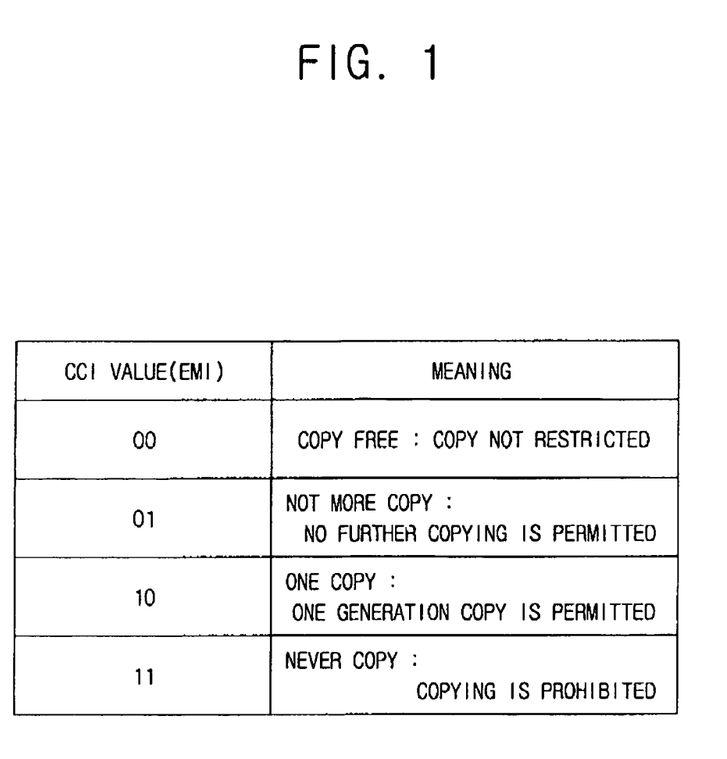
FIG. 1 illustrates an Encryption Mode Indicator (EMI) among a CCI value supporting an OpenCable standard.

FIG. 1 illustrates an Encryption Mode Indicator (EMI) among the CCI value applied from the OpenCable standard. As shown therein, the content which is the CCI value of '00' allows a copy free, and the content which is the CCI value of '01' prevents the copying of two or more generations, and the content which is the CCI value of '10' allows only the copy of one generation, and the content which is the CCI value of '11' does not allow any copying.

Figure 2:
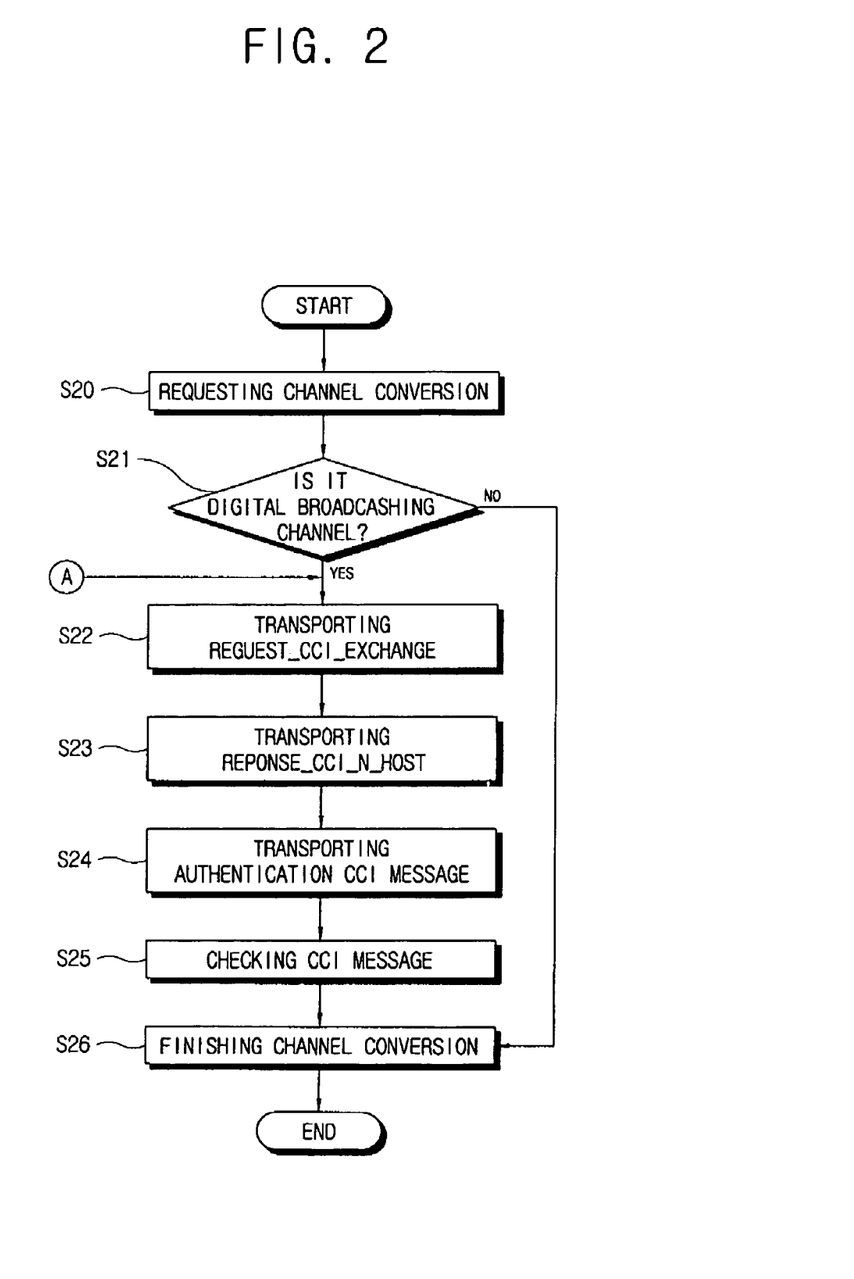
FIG. 2 illustrates an exchange process of the CCI values between a video device and a POD in the OpenCable standard.

FIG. 2 illustrates an exchange process of the CCI values between the video device and the POD in the OpenCable standard.

At operation S20, when a channel conversion request is received at the video device and then the channel is converted, at operation S21, the video device determines whether the converted channel is the digital broadcasting channel or not. At operation S26, when the converted channel is not a digital broadcasting channel, that is, when the converted channel is an analog broadcasting channel, the channel conversion is finished without the CCI value exchange.

Meanwhile, when the converted channel is a digital broadcasting channel, at operation S22, the POD transports a Request_CCI_Exchange to the video device. At operation S23, the video device receiving the Request_CCI_Exchange transports a Request_CCI_N_host to the POD in the response thereof.

At operation S24, in case where the Request CCI_N_host is received from the video device, the POD transports an Authentication CCI Message to the video device, and at operation S25, the video device determines the CCI value from the received Authentication CCI Message. Therefore, at operation S26, the channel conversion is finished. Accordingly, the video device controls whether the content of the appropriate digital broadcasting channel is copied or not, according to the CCI value.

Herein, when the CCI value of the appropriate digital broadcasting channel is not received at the video device in a process where the video device converts the channel into the digital broadcasting channel, the OpenCable standard requests that the video device set up the CCI value of the appropriate digital broadcasting channel as a '11' value. That is, copying is not allowed when the content of the digital broadcasting channel of the video device does not receive the CCI value.

However, in the OpenCable standard environments, when the user converts the analog broadcasting channel into the digital broadcasting channel while viewing the analog broadcasting channel, there is a case that the CCI value exchange with respect to the appropriate digital broadcasting channel is not accomplished. Particularly, when the user converts the channel into the analog broadcasting channel while viewing the special digital broadcasting channel, and the user converts the channel into the former digital broadcasting channel, an error happens because the CCI value exchange is not accomplished.

Therefore, copying is restricted when the content which is copied freely, that is, the public content, is exchanged during the channel conversion.

Further, when the user recognizes that the content of the digital broadcasting channel is the content in which the copying is allowed, the user may misunderstand the copy error of the video device.

SUMMARY OF THE INVENTION

Accordingly, it is an aspect of the present invention to provide a video device and a control method thereof which automatically set a copy control information (CCI) value if the CCI value related to the content of an identical digital broadcasting channel during channel conversion is not received.

The foregoing and/or other aspects of the present invention can be achieved by providing a video device determining whether a digital broadcasting channel through a POD is reproduced, comprising: a memory; a communicator which communicates with the POD; a controller to store a first copy control information (CCI) value with respect to a first digital broadcasting channel in the memory, in the conversion of the first digital broadcasting channel into an analog broadcasting channel, and sets the first CCI value stored in the memory to a second CCI value with respect to a second digital broadcasting channel if the second CCI value is not received through the communicator from the POD, in the conversion the analog broadcasting channel into the second digital broadcasting channel.

According to an aspect of the present invention, the first digital broadcasting channel and the second digital broadcasting channel satisfy an OpenCable Interface standard.

According to an aspect of the present invention, the controller sets up the first CCI value stored in the memory to the second CCI value with respect to the second digital broadcasting channel, if the first digital broadcasting channel is the same as the second digital broadcasting channel.

According to an aspect of the present invention, the controller sets up the first CCI value stored in the memory to the second CCI value with respect to the second digital broadcasting channel, if the content of the first digital broadcasting channel is the same as the content of the second digital broadcasting channel.

According to an aspect of the present invention, the second CCI value comprises an encryption mode indicator (EMI) value.

According to an aspect of the present invention, the video device comprises either an OpenCable Set Top Box or a Cable Ready digital television.

The foregoing and/or other aspects of the present invention can be achieved by providing a control method of a video device for determining whether a digital broadcasting channel through a POD is reproduced, comprising: reproducing a first digital broadcasting channel; storing a first CCI value with respect to the first digital broadcasting channel, if the first digital broadcasting channel is converted into an analog broadcasting channel; detecting a second CCI value with respect to a second digital broadcasting channel, if the analog broadcasting channel is converted into the second digital broadcasting channel; and setting the stored first CCI value to the second CCI value, if the second CCI value is not received.

According to an aspect of the present invention, the first digital broadcasting channel and the second digital broadcasting channel satisfy an OpenCable Interface standard.

According to an aspect of the present invention, the control method may further comprise detecting whether the first digital broadcasting channel is the same as the second digital broadcasting channel; wherein the setting of the stored first CCI value to the second CCI value is accomplished if the first digital broadcasting channel is the same as the second digital broadcasting channel.

According to an aspect of the present invention, the control method may further comprise detecting whether the content of the first digital broadcasting channel is the same as the content of the second digital broadcasting channel; wherein the setting of the stored first CCI value to the second CCI value is accomplished if the content of the first digital broadcasting channel is the same as the content of the second digital broadcasting channel.

According to an aspect of the present invention, the second CCI value comprises at least one of an encryption mode indicator (EMI) value and an analog protection system (APS) value.

BRIEF DESCRIPTION OF THE DRAWINGS

The above and/or other aspects of the prevent invention will become apparent and more readily appreciated from the following description of the exemplary embodiments, taken in conjunction with the accompany drawings, in which.

DETAILED DESCRIPTION OF THE ILLUSTRATIVE, NON-LIMITING EMBODIMENTS OF THE INVENTION

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

Figure 3:
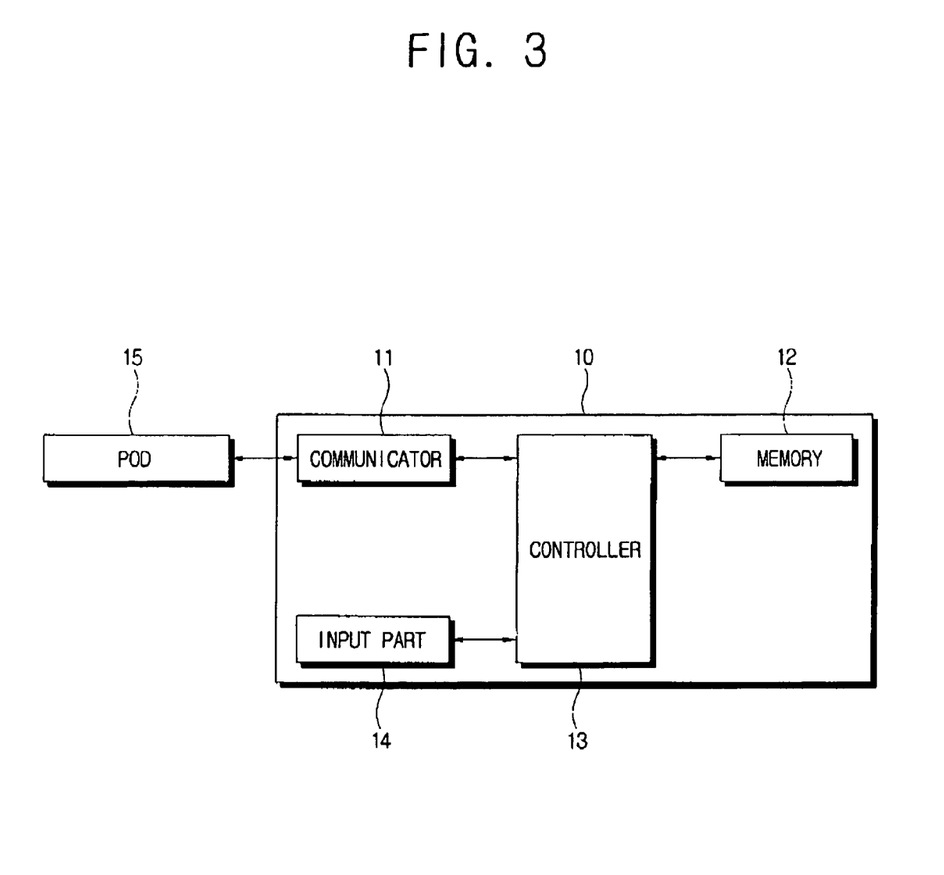
FIG. 3 is a control block diagram of the video device consistent with an exemplary embodiment of the present invention.

Referring to FIG. 3, in a video device 10 according to the present invention, a Point Of Deployment (POD) 15 determines whether a digital broadcasting channel is reproduced or not. Herein, the video device 10 selectively reproduces the digital broadcasting channel and an analog video channel. The video device 10 may be applied to an Opencable Set Top Box or Cable Ready digital television.

The video device 10 according to the present invention includes a memory 12, a communicator 11, and controller 13.

The POD 15 supports an OpenCable standard, and determines whether the digital broadcasting channel corresponding to the OpenCable standard is reproduced or not. The POD 15 descrambles a scrambled transport stream of the digital broadcasting channel corresponding to the OpenCable standard, and codes the descrambled transport stream (with CP Encryption) corresponding to standard rules related to a Copy Protection System (CPS) and then transports the coded transport stream to the video device 10.

The communicator 11 communicates with the POD 15 according to the control of the controller 13.

The controller 13 converts a channel into an appropriate channel when channel conversion is requested through an input part 14. Herein, when converting into the digital broadcasting channel, the communicator 11 exchanges a CCI value with the POD 15 through the communicator 11. An exchange process of the CCI value is shown in FIG. 2.

When the digital broadcasting channel being reproduced now (hereinafter referred to a first digital broadcasting channel) is converted into the analog digital broadcasting channel, the controller 13 stores the CCI value related to the first digital broadcasting channel in the memory 12. Further, when the analog digital broadcasting channel is returned to the digital broadcasting channel (hereinafter referred to a second digital broadcasting channel), the controller 13 detects whether the CCI value is received from the POD 15 through the communicator 11 or not. That is, the broadcasting channel is subsequently converted into the first digital broadcasting channel, then to the analog digital broadcasting channel, and then to the second digital broadcasting channel. Herein, the conversion to the analog digital broadcasting channel can include when the channel is converted many times among the analog digital broadcasting channels.

At this moment, when the controller 13 has not received a CCI value through the communicator 11, the controller 13 sets up the CCI value stored in the memory 12 to the CCI value related to the second digital broadcasting channel. Therefore, when the CCI value related to the second digital broadcasting channel is not exchanged between the controller 12 and POD 15, the video device 10 determines a copy range corresponding to the second digital broadcasting channel on the basis of the CCI value related to the first digital broadcasting channel.

Figure 4:
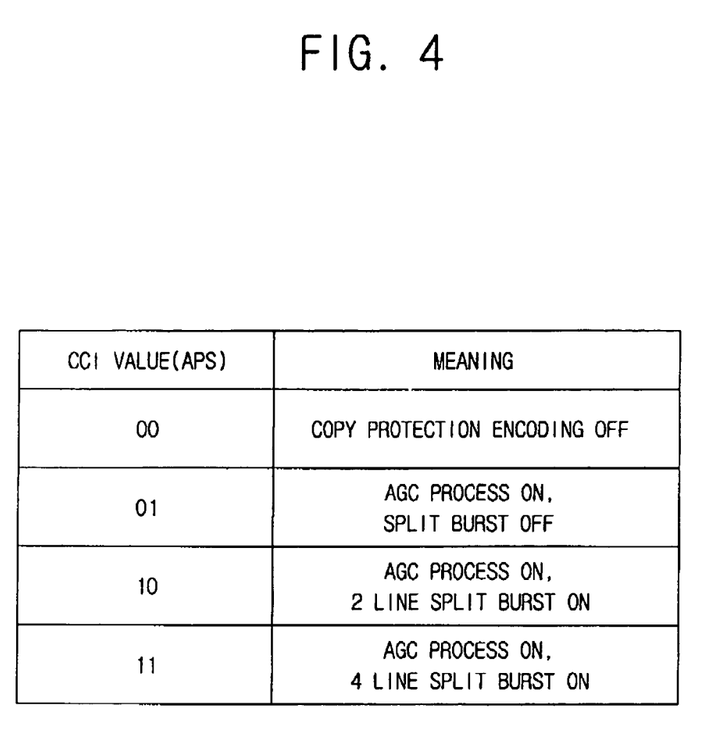
FIG. 4 illustrates an Analog Protection System Value (APS) among the CCI value supporting the OpenCable standard.

Herein, the CCI value, which is stored in the memory 12 and is set up by the second digital broadcasting channel, may comprise an Encryption Mode Indicator (EMI) value and/or an Analog Protection System (APS) value. The EMI value corresponds to FIG. 1, and the APS value related to the copy protection according to the content of the analog broadcasting channel corresponds to FIG. 4. The APS value corresponds to a Copy Protection System (CPS) standard.

Figure 5:
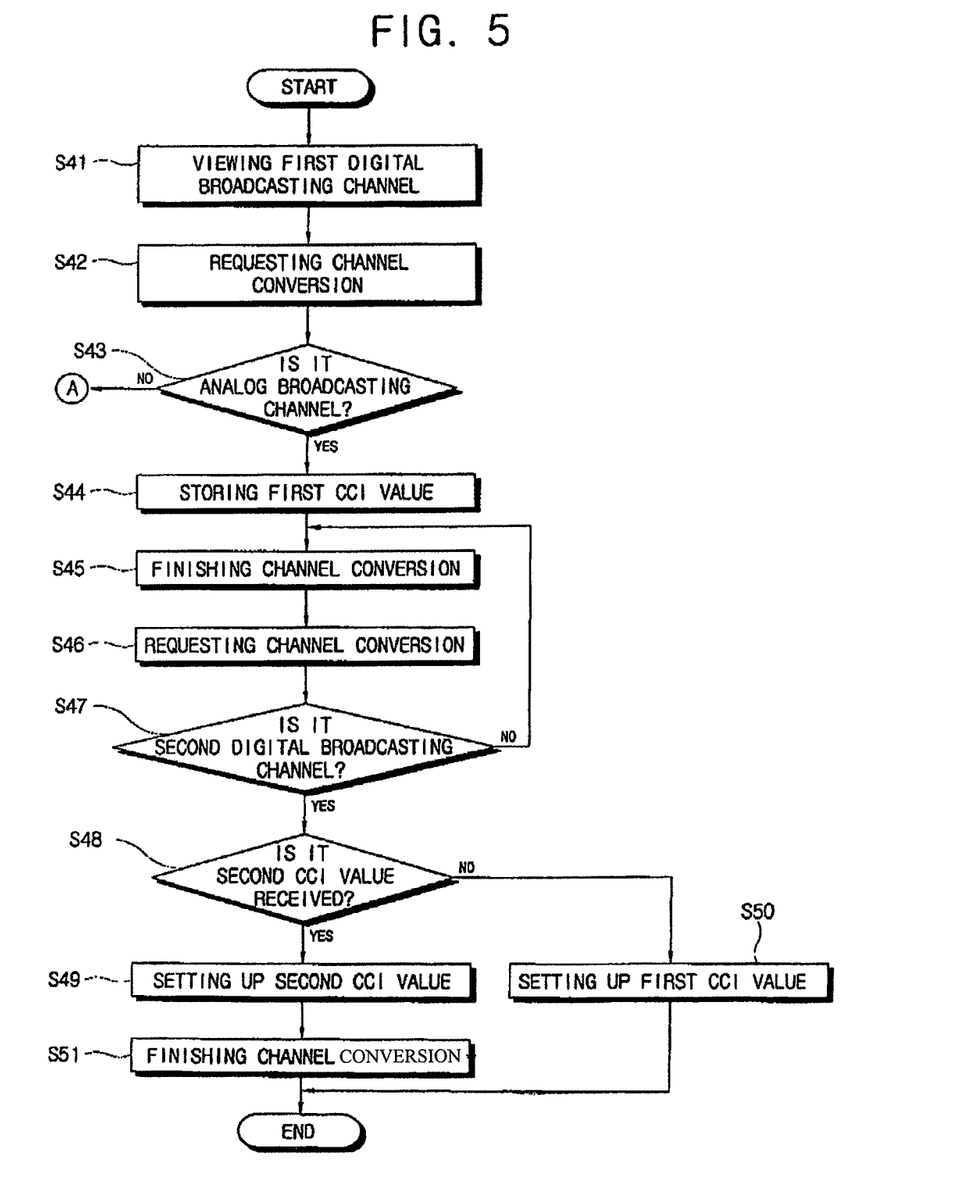
FIG. 5 is a control flow diagram of a video device consistent with a first exemplary embodiment of the present invention.

Hereinafter, a control process of the video device 10 according to a first embodiment will be described with reference to FIG. 5.

At operation S41, while a user views a first digital broadcasting channel, at operation S42, if the user requests channel conversion at the video device 10 through operation of an input part 14, at operation S43, a controller 13 converts the channel into the channel that the user selects (hereinafter referred to the selected channel), and determines whether the selected channel is an analog broadcasting channel or not.

Herein, if the selected channel is the digital broadcasting channel, as shown in FIG. 2, the controller 13 exchanges a CCI value with a POD 15.

Meanwhile, at operation S44, if the selected channel is the analog broadcasting channel, the controller 13 stores a CCI value of the first digital broadcasting channel (hereinafter referred to the first CCI value) in a memory 12. The first CCI value already has been set up through the exchange process of the CCI value with the POD 15, as shown in FIG. 2, in conversion to the first CCI value.

At operation S45, the controller 13 finishes the channel conversion to the appropriate analog broadcasting channel.

At operation S46, while the user views the analog broadcasting channel, if the user requests the channel conversion to the video device 10 through the operation of the input part 14, at operation S47, the controller 13 detects whether the selected channel is a second digital broadcasting channel or not. At operation S45, if the selected channel is the analog broadcasting channel, the controller 13 converts it into the appropriate analog broadcasting channel.

Meanwhile, at operation S47, if the selected channel is the second digital broadcasting channel, the controller 13 detects whether the CCI value related to the second digital broadcasting channel (hereinafter referred to the second CCI value) is received through a communicator 11 from the POD 15. Herein, if the second CCI value is received through the communicator 11 due to a normal exchange with the POD 15, at operation S49, the received second CCI value is set up, and at operation S51, the channel conversion of the second digital broadcasting channel is finished.

Further, at operation S48, if the second CCI value is not received through the communicator 11, that is the CCI value is not normally exchanged with the POD 15, at operation S50, the first CCI value stored in the memory 12 is set up as the second CCI value, and at operation S51, the channel conversion of the second digital broadcasting channel is finished.

Herein, the controller 13 may already have stored the first CCI value in the memory 12 before the user requests the channel conversion.

Hereinafter, a control process of the video device 10 according to a second exemplary embodiment will be described with reference to FIG. 6. Herein, the operations S61 through S66 in a control process of the video device 10 according to the second exemplary embodiment correspond to the operations S41 through S46 in a control process of the video device 10 according to the first exemplary embodiment.

Figure 6:
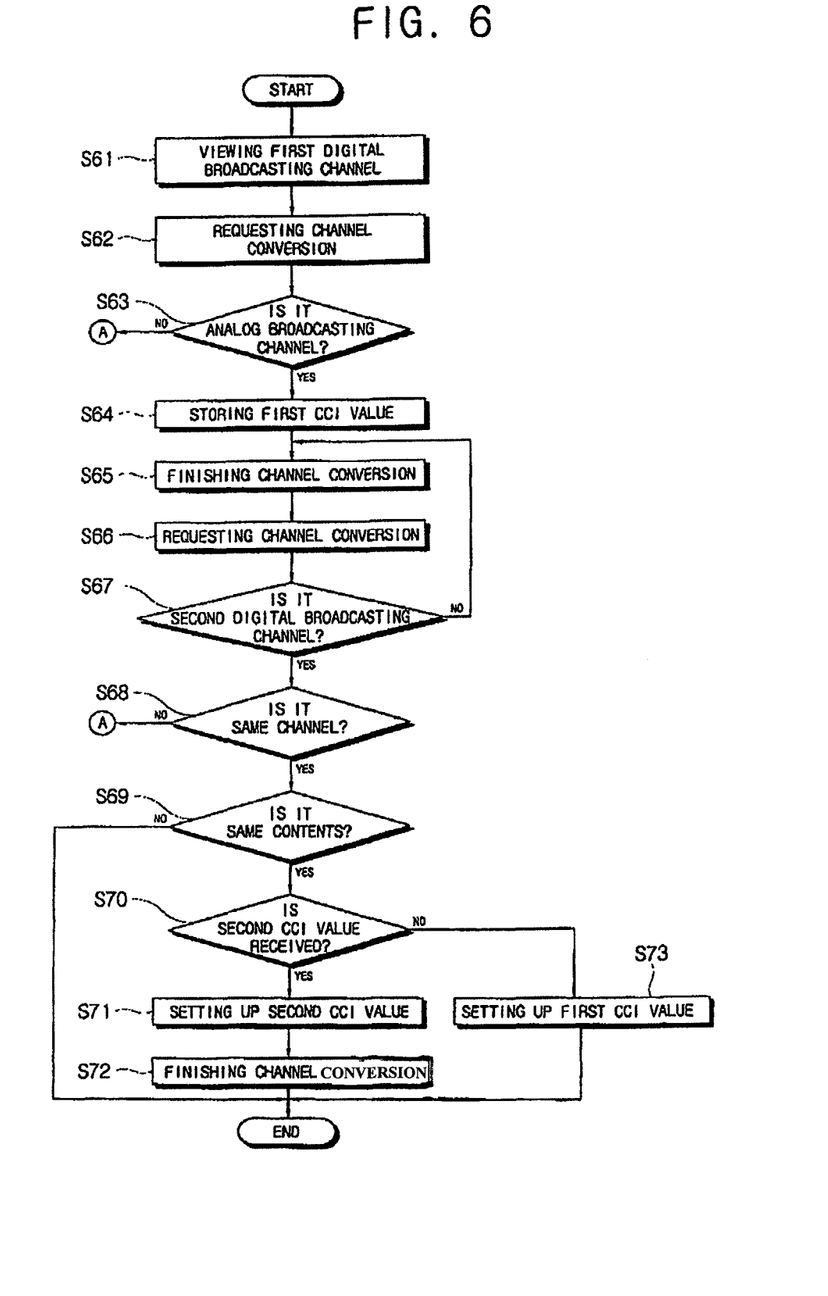
FIG. 6 is a control flow diagram of a video device consistent with a second exemplary embodiment of the present invention.

As shown in FIG. 6, at operation S67, when the selected channel is the second digital broadcasting channel, at operation S68, the controller 13 detects whether the first digital broadcasting channel is equal to the second digital broadcasting channel. Herein, when the first digital broadcasting channel is not equal to the second digital broadcasting channel, referring to FIG. 2, the controller 13 finishes the channel conversion through the exchange process of the CCI value with the POD 15.

Meanwhile, at operation S68, if the first digital broadcasting channel is determined as the same as the second digital broadcasting channel, at the operation S69, the controller 13 determines whether the content of the first digital broadcasting channel is the same as the content of the second digital broadcasting channel. The same content can be determined by a program number related to the content.

If it is determined that the content of the first digital broadcasting channel is not the same as the content of the second digital broadcasting channel, at the operation S72, the controller 13 finishes the channel conversion of the second digital broadcasting channel without regard to the exchange of the second CCI value. In this case, the second CCI value is set to '11'.

Meanwhile, when the content of the first digital broadcasting channel is determined to be the same as the content of the second digital broadcasting channel, at the operation S70, the controller 13 detects whether the second CCI value is received through the communicator 11 from the POD 15. Herein, if the second CCI value is received through the communicator 11 due to a normal exchange of the CCI value with the POD 15, at operation S71, the received second CCI value is set up, and at operation S72, the channel conversion of the second digital broadcasting channel is finished.

Further, if the second CCI value is not received through the communicator 11, that is, the CCI value is not normally exchanged with the POD 15, at operation S73, the first CCI value stored in the memory 12 is set to the second CCI value, and at operation S72, the channel conversion of the second digital broadcasting channel is finished.

Accordingly, even if the second CCI value is not received through the communicator 11, only if the channel and the content of the second digital broadcasting is the same as that of the first digital broadcasting, the first CCI value is set to the second CCI value. Therefore, the CPS standard according to the OpenCable standard is satisfied even if the copy allow range may be changed according to the channel conversion and/or the content conversion.

Herein, even if the operation S68 and the operation S70 is abbreviated in the control process of the video device 10 according to the second exemplary embodiment of the present invention shown in FIG. 6, the foregoing result can be attainted, and also the standard of the CPS on the OpenCable standard is satisfied.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video device determining whether a digital broadcasting channel through a point of deployment (POD) is reproduced, comprising:
    a memory;
    a communicator which communicates with the POD;
    a controller which stores a first copy control information (CCI) value with respect to a first digital broadcasting channel in the memory in response to receiving a command to change a channel received at the video device from the first digital broadcasting channel to an analog broadcasting channel, changes the channel received at the video device from the first digital broadcasting channel to the analog broadcasting channel in response to storing the first CCI, receives a command to change the channel received at the video device from the analog broadcasting channel to a new broadcasting channel, determines whether the first digital broadcasting channel is the same as the new broadcasting channel in response to receiving the command to change the channel received at the video device from the analog broadcasting channel to the new broadcasting channel, and if a CCI value with respect to the new broadcasting channel is not received sets a second CCI value with respect to the new broadcasting channel to be equal to the first CCI value stored in the memory in response to determining that the first digital broadcasting channel is the same as the new broadcasting channel.

2. The video device according to claim 1, wherein the first digital broadcasting channel and the new broadcasting channel satisfy an OpenCable Interface standard.

3. The video device according to claim 1, wherein the controller determines whether first content of the first digital broadcasting channel is the same as second content of the new broadcasting channel and sets the second CCI value with respect to the new broadcasting channel to be equal to the first CCI value stored in the memory in response to determining that the first content of the first digital broadcasting channel is the same as the second content of the new broadcasting channel.

4. The video device according to claim 3, wherein the second CCI value comprises an encryption mode indicator (EMI) value.

5. The video device according to claim 1, wherein the video device comprises either an OpenCable Set Top Box or a Cable Ready digital television.

6. A control method of a video device for determining whether a digital broadcasting channel through a point of deployment (POD) is reproduced, said method comprising:
    reproducing a first digital broadcasting channel;
    storing a first CCI value with respect to the first digital broadcasting channel in response to receiving a command to change a channel received at the video device from the first digital broadcasting channel to an analog broadcasting channel;
    changing the channel received at the video device from the first digital broadcasting channel to the analog broadcasting channel in response to the storing;
    receiving a command to change the channel received at the video device from the analog broadcasting channel to a new broadcasting channel;
    determining that the first digital broadcasting channel is the same as the new broadcasting channel in response to receiving the command to change the channel received at the video device from the analog broadcasting channel to the new broadcasting channel;
    detecting that a second CCI value with respect to the new broadcasting channel is not received in response to the determining; and
    setting the second CCI value to be equal to the first CCI value stored in the memory in response to detecting that the second CCI value is not received.

7. The control method of the video device according to claim 6, wherein the first digital broadcasting channel and the new broadcasting channel satisfy an OpenCable Interface standard.

8. The control method of the video device according to claim 6, further comprising detecting whether first content of the first digital broadcasting channel is the same as second content of the new broadcasting channel,
    wherein the setting the second CCI value to be equal to the first CCI value is performed in response to detecting that the first content of the first digital broadcasting channel is the same as the second content of the new broadcasting channel.

9. The control method of the video device according to claim 8, wherein the second CCI value comprises at least one of an encryption mode indicator (EMI) value and an analog protection system (APS) value.

* * * * *